United States Patent [19]

Rademaker et al.

[11] Patent Number: 5,675,483
[45] Date of Patent: Oct. 7, 1997

[54] POWER SUPPLY COMPRISING MEANS FOR IMPROVING THE POWER FACTOR

[75] Inventors: Gerrit Rademaker, Soest; Hans Fennik, Berkhout, both of Netherlands

[73] Assignee: U.S. Philips Corporation, New York, N.Y.

[21] Appl. No.: 491,008

[22] Filed: Jun. 15, 1995

[30] Foreign Application Priority Data

Jun. 15, 1994 [EP] European Pat. Off. ............... 94201715

[51] Int. Cl.$^6$ ................................................. H02M 3/335
[52] U.S. Cl. ...................... 363/70; 363/21; 363/65
[58] Field of Search .......................... 363/21, 65, 67, 363/69, 70, 71, 97

[56] References Cited

U.S. PATENT DOCUMENTS

| 4,270,165 | 5/1981 | Carpenter et al. | 363/65 |
|---|---|---|---|
| 4,814,965 | 3/1989 | Peterson | 363/21 |
| 5,019,954 | 5/1991 | Bourgeault et al. | 363/71 |
| 5,065,302 | 11/1991 | Kanazawa | 363/65 |
| 5,088,019 | 2/1992 | Williams et al. | 363/69 |
| 5,103,388 | 4/1992 | Williams et al. | 363/69 |
| 5,161,241 | 11/1992 | Kanai | 363/21 |
| 5,272,612 | 12/1993 | Harada et al. | 363/65 |
| 5,508,903 | 4/1996 | Alexndrov | 363/71 |

FOREIGN PATENT DOCUMENTS 0476278  3/1992  European Pat. Off. ......... H02M 1/12

Primary Examiner—Jeffrey L. Sterrett
Attorney, Agent, or Firm—Edward Blocker

[57] ABSTRACT

A power supply with improved power factor comprises a first rectifier circuit connected to an electric mains and which has first output terminals for supplying a first pulsating direct voltage. A buffer capacitor is connected parallel to the first output terminals and an inverter is connected to the buffer capacitor. A second rectifier circuit is connected to the mains and has second output terminals for supplying a second pulsating direct voltage. A flyback converter is connected to the second output terminals and has output terminals connected parallel to the buffer capacitor. The converter increases the power factor of the power supply and is operative to supply a maximum power which is substantially lower than the maximum power of the first rectifier circuit. The converter comprises a transformer with a primary winding and a secondary winding. The primary winding is connected in series with a switching element in order to form a primary series circuit connected to the second input terminals and the secondary winding is connected in series with a rectifier element in order to form a secondary series circuit connected to the second output terminals.

16 Claims, 2 Drawing Sheets

5,675,483

POWER SUPPLY COMPRISING MEANS FOR IMPROVING THE POWER FACTOR

BACKGROUND OF THE INVENTION

This invention relates to a power supply for converting an alternating voltage supplied by an electric mains into a desired voltage, comprising first rectifier means with first input terminals which are operative to receive the alternating voltage and first output terminals for delivering a first pulsating direct voltage, a buffer capacitor which is connected parallel to the first output terminals, an inverter with first input terminals which are connected to the buffer capacitor, second rectifier means with second input terminals which are connected parallel to the first input terminals and second output terminals for delivering a second pulsating direct voltage, and a converter with second input terminals which are connected to the second output terminals and output terminals which are connected parallel to the buffer capacitor.

A power supply of this kind is known from EP-A-0 476 278. The energy stored in the buffer capacitor serves to feed the inverter. The converter of the known power supply serves to replenish the energy applied to the inverter by the buffer capacitor in such a manner that the power factor of the energy drawn from the electric mains is substantially equal to 1. The converter is formed by a boost converter whose output voltage is higher than that of the first rectifier means. The power supply is designed so that in normal circumstances the first rectifier means, do not contribute to the replenishment of the energy in the buffer capacitor and hence do not draw energy from the mains. It is only when the converter, being constructed as a detachable unit, becomes faulty or is completely absent that the first rectifier means take over the task of the converter so that the inverter still receives energy, although the power factor of the energy drawn from the mains is then substantially smaller than 1.

Because the converter must have a high output voltage and must be capable of delivering the full amount of energy used by the inverter in all circumstances, it must be constructed with components which are suitable for high powers. Such components are voluminous and expensive so that the converter is comparatively heavy and expensive. If a high power factor is not absolutely required, a user of the power supply will be readily inclined to abstain from using the converter in order to save costs. In the known power supply the user can thus choose between on the one hand a high power factor accompanied by high cost price and heavy weight and on the other hand a low power factor accompanied by low weight and low cost price.

SUMMARY OF THE INVENTION

It is an object of the invention to provide a power supply of the kind set forth in which a comparatively high power factor is combined with a low weight and a comparatively low cost price. To achieve this, the power supply in accordance with the invention is characterized in that the converter is operative to deliver a maximum power which is substantially lower than the maximum power of the first rectifier means, and that the converter is formed by a flyback converter comprising a transformer with a primary and a secondary winding, the primary winding being connected in series with a switching element which comprises a control electrode, the primary winding and the switching element forming a primary series circuit whose ends are connected to the second input terminals, the secondary winding being connected in series with a rectifier element in order to form a secondary series circuit whose ends are connected to the second output terminals, the control electrode of the switching element being connected to a control circuit which is operative to supply the control electrode with a first control signal in the form of a series of pulses. The invention is based on the idea that the power factor need not always be very high. A power supply in which the buffer capacitor is recharged exclusively by the first rectifier means has a very poor power factor of, for example, approximately from 0.6 to 0.7. A power supply in which the buffer capacitor is recharged exclusively by a boost converter, whereas the first rectifier means serve merely as a spare, has a very high power factor of, for example, approximately 0.99. In the power supply in accordance with the invention a substantial part of the energy for the buffer capacitor is supplied by the converter and the rectifier means replenish the shortage when the converter reaches its maximum power. Consequently, in the case of low powers the power factor will be determined substantially exclusively by the converter and will amount to, for example, approximately 0.98. In the case of higher powers, the lower power factor of the first rectifier means becomes more important, so that the power factor gradually decreases to a value of, for example, approximately 0.9. This is still substantially higher than in a power supply comprising exclusively first rectifier means and it still satisfies the requirements usually imposed. For example, the standard EN 60555 specifies a power factor of at least 0.85. A flyback converter comprising a transformer is capable of supplying an output voltage which is slightly higher than the peak value of the first pulsating direct voltage supplied by the first rectifier means without requiting large and expensive components for this purpose.

A preferred embodiment of the apparatus in accordance with the invention is characterized in that there is provided a comparator circuit which is operative to compare the voltage difference between the output terminals of the converter with the peak value of the first pulsating direct voltage and to supply a control input of the control circuit with a second control signal which is dependent on said voltage difference and which influences the first control signal supplied by the control circuit in such a manner that the voltage difference between the output terminals of the converter is substantially equal to the peak value of the first pulsating direct voltage. The output voltage of the converter is preferably equal to the peak value of the first pulsating direct voltage or is slightly (a few volts) higher than this value. As a result of the described steps, this state is reached in a simple and inexpensive manner.

A further preferred embodiment of the power supply of the invention is characterized in that between one of the second output terminals and one of the second input terminals there is included at least one self-inductance whose end facing the primary series circuit is connected to an anode of a rectifier element whose cathode is connected to the positive electrode of the buffer capacitor. As a result of this step, the current through the primary winding of the transformer also flows through the self-inductance. This current is periodically interrupted by the switching element, thus causing a voltage peak in the self-inductance. As a result, via the rectifier element the self-inductance applies current to the buffer capacitor so as to contribute to the replenishment of the charge of the buffer capacitor. This additional contribution is achieved substantially without additional cost if the self-inductance forms part of a high-frequency filter inserted between one of the second output terminals and one of the second input terminals.

BRIEF DESCRIPTION OF THE DRAWINGS

These and other aspects of the invention will be described in detail hereinafter with reference to the drawing.

DESCRIPTION OF THE PREFERRED EMBODIMENTS

Figure 1:
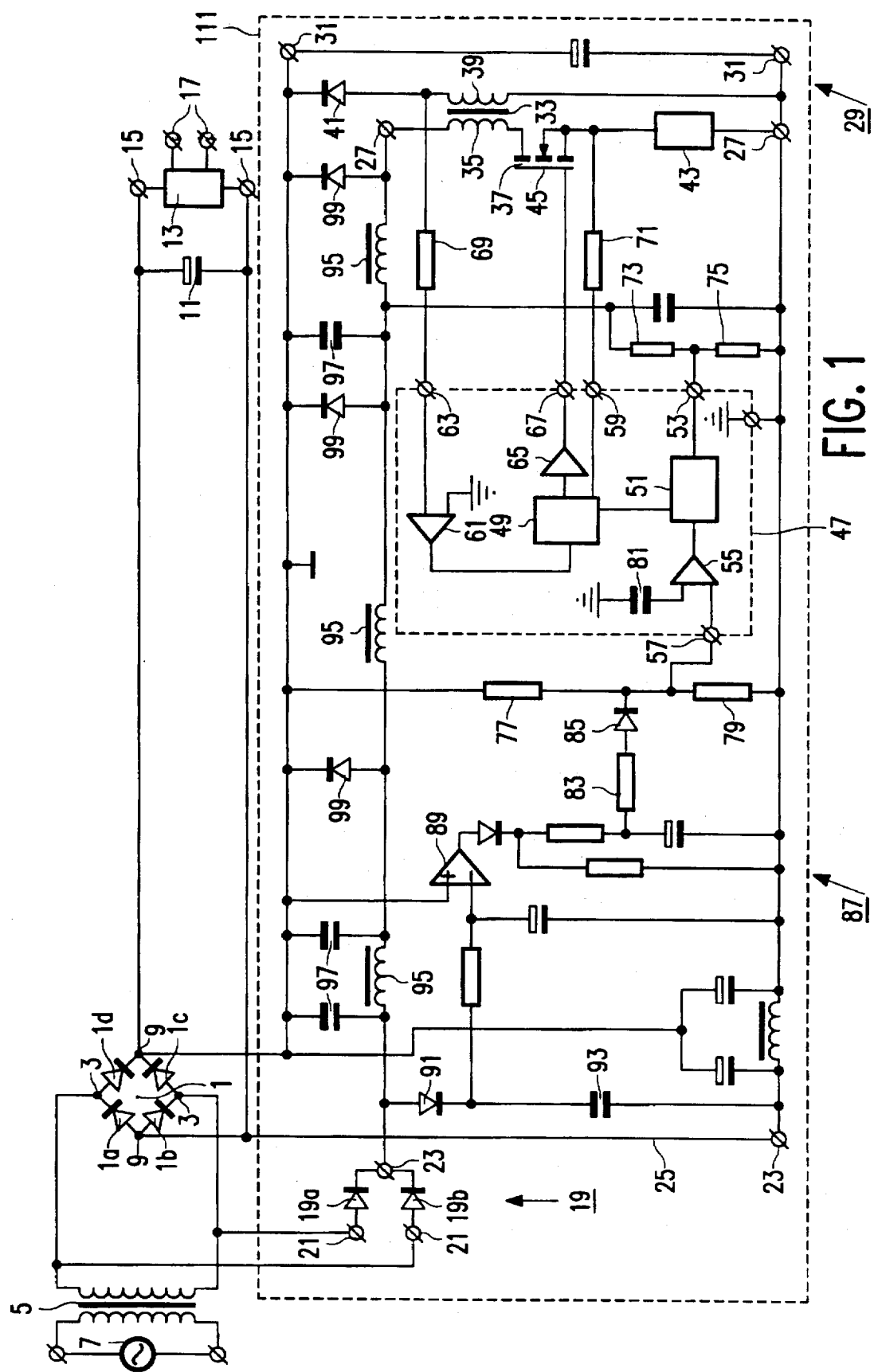
FIG. 1 shows a circuit diagram of an embodiment of a power supply in accordance with the invention.

The power supply whose diagram is shown in FIG. 1 comprises first rectifier means 1 in the form of a first bridge circuit of four diodes 1a, 1b, 1c and 1d. The first bridge circuit 1 comprises first input terminals 3 which can be connected directly, or via a transformer 5 as in the embodiment shown, to an electric mains 7 which supplies an alternating voltage. The first bridge circuit 1 also comprises first output terminals 9 wherebetween a first pulsating alternating voltage is present. A buffer capacitor 11 is connected parallel to the first output terminals 9 and an inverter 13 is provided with input terminals 15, connected to the electrodes of the buffer capacitor, and with output terminals 17 wherefrom a desired voltage can be derived. The inverter 13 consists of a circuit for converting the direct voltage present across the buffer capacitor 11 into one or more alternating voltages. Circuits of this kind are known per se and will not be elaborated herein. If desired, the inverter 13 may be succeeded by further rectifier means (not shown).

The power supply also comprises second rectifier means 19 which comprise a second bridge circuit with two further diodes 19a and 19b and the diodes 1a and 1b. The second rectifier means 19 comprise second input terminals 21, connected parallel to the first input terminals 3, and second output terminals 23 on which a second pulsating direct voltage is available. One of the second output terminals 23 is connected, via a connection 25, to one of the first output terminals 9. The second output terminals 23 are connected to second input terminals 27 of a flyback converter 29 which comprises output terminals 31 which are connected parallel to the buffer capacitor 11. The flyback converter 29 is formed by a circuit which is known per se and which comprises a transformer 33, a primary winding 35 of which is connected in series with a switching element 37 in order to form a primary series circuit, and a secondary winding 39 of which is connected in series with a rectifier element 41 in order to form a secondary series circuit. These components are chosen so that they are suitable for comparatively small powers and are hence comparatively small and inexpensive. The maximum power that can be delivered by the flyback converter 29, therefore, is substantially lower than the maximum power of the first rectifier mains 1; for example, it amounts to only half that power. The ends of the primary series circuit 35, 37 are connected to the second input terminals 27, a resistor 43 being connected between the switching element and one of these input terminals. The ends of the secondary series circuit 39, 41 are connected to the second output terminals 31. The switching element 37 of the present embodiment is formed by a MOSFET. If desired, it can be successfully replaced by another known switching element, for example a bipolar transistor. The gate electrode of the MOSFET constitutes a control electrode 45 of the switching element 37. This control electrode is connected to a control circuit 47 which is operative to supply the control electrode with a first control signal in the form of a series of pulses. The control circuit 47 may consist of, for example, an integrated circuit of the type Motorola MC34262. This known circuit comprises a central unit 49 which includes, inter alia, a latch, a timer, a pulse width modulator and a logic circuit. The circuit also comprises a multiplier 51 with a multiplier input 53 and a second input which is connected to a voltage feedback input 57 via a differential amplifier 55. The output of the multiplier 51 is connected to an input of the central unit 49 which also receives signals from a current measuring input 59 and a zero current detector 61 which is connected to a zero current detection input 63. The output of the central unit 49 is connected, via an output amplifier 65, to a control output 67 of the control circuit 47.

In the embodiment shown in FIG. 1, the control output 67 is connected to the control electrode 45 of the switching element 37. The zero current detection input 63 is connected, via a resistor 69, to the secondary winding 39 of the transformer 33. At the instant at which the current through the secondary winding 39 equals zero, the zero current detector 61 applies a signal to the central unit which enables this unit to deliver a pulse on the control output 67. The current measuring input 59 is connected, via a resistor 71, to the junction of the resistor 43 and the switching element 37 in order to receive a voltage which is a measure of the current through the switching element. Via voltage divider which is formed by two resistors 73 and 75, the multiplier input 53 receives a voltage which is proportional to the second pulsating direct voltage. The voltage feedback input 57 receives, via a voltage divider which is formed by resistors 77 and 79, a voltage which is proportional to the voltage difference existing between the output terminals 31 of the converter 29. This voltage is applied to an input of the differential amplifier 55, the other input of which receives a reference voltage generated by an internal voltage source 81. The differential amplifier 55 supplies the central unit 49 with a signal which keeps the output voltage of the converter 29 at a predetermined value. The voltage feedback input 57 is also connected, via a resistor 83 and a diode 85, to a comparator circuit 87 which is operative to compare the voltage difference between the output terminals 31 of the converter 29 with the peak value of the first pulsating direct voltage. The comparator circuit 87 comprises a differential amplifier 89, the positive input of which is connected to one of the output terminals 31. Because the first and second rectifier means receive the same alternating voltage and rectify this voltage in the same manner, the peak value of the first pulsating direct voltage is the same as that of the second pulsating direct voltage. Therefore, for the sake of simplicity the negative input of the differential amplifier 89 is connected to the second rectifier means 19. This connection includes a peak detector with a diode 91 and a capacitor 93. The comparator circuit 87 is adjusted so that the voltage applied to the anode of the diode 85 is slightly lower than the voltage applied to the cathode via the voltage divider 77, 79 if the voltage on the positive input of the differential amplifier 89 is lower than the voltage applied to the negative input. The diode 85 is then blocked and the feedback input 57 receives, as described above, a voltage which is proportional to the output voltage of the converter 29. As soon as the voltage on the positive input of the differential amplifier 89 is higher than the voltage of the negative input, the output voltage of the differential amplifier increases so that the diode 85 becomes conductive and the higher voltage is applied to the voltage feedback input 57. The control circuit interprets this as an excessively high output voltage of the converter 29 and decreases this output voltage until the diode 85 is no longer conductive. The voltage feedback input thus also serves as a control input of the control circuit 47 whereto the output signal of the comparator circuit 87 is applied as the second control signal. Generally speaking, the setting of the comparator circuit 87 will be chosen so that the output voltage of the converter 29 is substantially equal to the peak value of the first pulsating direct voltage. The term "substantially equal to" is to be understood to mean herein as "equal to or at the most a few volts higher".

The first control signal, applied to the control electrode 45 of the switching element 37, is formed by a series of switching pulses with a comparatively high recurrent frequency, for example, more than one hundred kHz. The current through the primary winding 35 of the transformer 33, therefore, consists of a series of pulses of the same recurrent frequency. In order to prevent transfer of high-frequency interference to the electric mains 7, in the connection between the second input terminal 27, connected to the primary winding 35, and the second output terminal 23, connected to the diodes 19a and 19b, there is inserted a high-frequency filter which comprises a number of self-inductances 95 and capacitors 97. Each current pulse through the primary winding 35 also flows through the self-inductances 95. When the switching element 37 is switched off, magnetic energy is thus also present in the self-inductances 95. For suitable operation of the high-frequency filter it is necessary that this energy is quickly drained. To this end, the end of each self-inductance 95 which faces the primary series circuit 35, 37 is connected to the anode of a rectifier element (diode) 99 whose cathode is connected to the positive electrode of the buffer capacitor 11. As a result of this step, it is achieved not only that the magnetic energy in the self-inductances 95 is quickly drained, but also that this energy is effectively used to replenish the charge of the buffer capacitor 11. The buffer capacitor 11 thus receives energy via the output terminals 31 of the converter 29 and via the diodes 99. The combination of self-inductances 95 and diodes 99 operates as a boost converter whose most complex and expensive component (the self-inductance) is present anyway because it forms part of the high-frequency filter.

Figure 2:
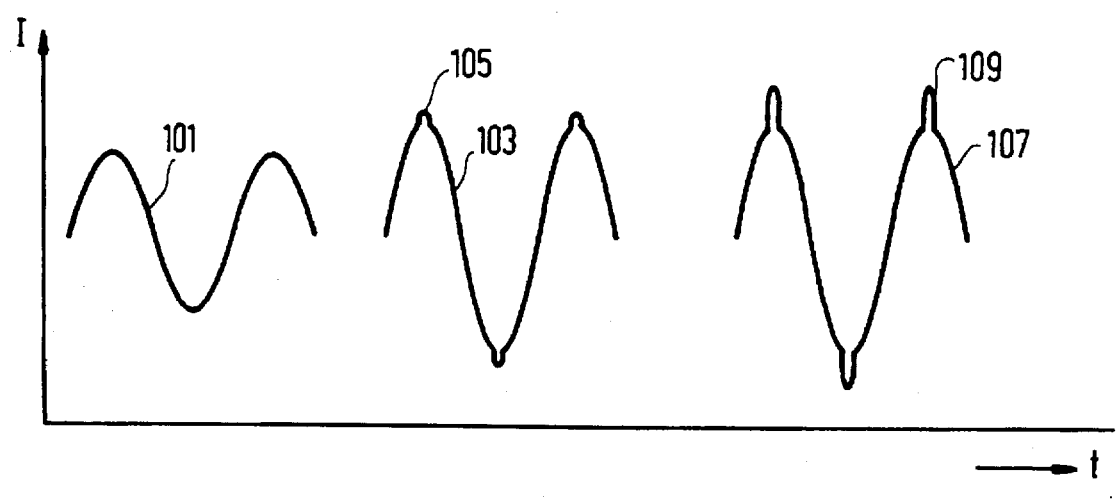
FIG. 2 shows a diagram of input currents of the power supply of FIG. 1 for different powers.

In order to illustrate the operation of the described power supply, FIG. 2 shows a diagram in which the variation of the current I drawn from the electric mains 7 is plotted as a function of time t for different loads of the inverter 13. It concerns an embodiment in which the voltage across the buffer capacitor 11 equals 50 V and the maximum power to be delivered by the flyback converter 29 amounts to approximately 300 W. The first curve 101 represents the variation of the current for a load of 140 W. In that case the energy for the buffer capacitor 11 is delivered entirely by the converter 29 and, therefore, the current I is substantially sinusoidal. This means that the power factor is substantially equal to 1. The second curve 103 represents the variation of the current I for a load of 300 W. The converter 29 then delivers the maximum power and on the crests of the sinusoidal current curve there appear small peaks 105 which indicate that at these instants the first rectifier means 1 must make a small contribution to the replenishment of the energy of the buffer capacitor 11. The power factor is slightly lower than in the foregoing case, but it is still close to 1. The third curve 107 represents the current variation for a load of 500 W. A substantially larger part of the total energy required is now delivered by the first rectifier means and the peaks 109 on the crests of the sinusoidal curve are also substantially higher. The power factor is in this case still slightly higher than the minimum value of 0.85 specified by the EN 60555 standard. These curves illustrate that a comparatively small flyback converter 29, capable of delivering a maximum power of approximately 300 W, can keep the power factor of a power supply for an output power of more than 500 W within acceptable limits.

In FIG. 1 the combination formed by the flyback converter 29 and the associated circuits and the diodes 19a and 19b is enclosed by a dashed box 111. The unit present within this box can be constructed as a separate "update" unit which can be added, if desired, to an existing power supply comprising first rectifier means 1, a buffer capacitor 11 and an inverter 13.

We claim:

1. A power supply for converting an alternating voltage supplied by an electric mains into a desired voltage, comprising: first rectifier means having first input terminals operative to receive the alternating voltage and first output terminals for delivering a first pulsating direct voltage, a buffer capacitor connected parallel to the first output terminals, an inverter with input terminals connected to the buffer capacitor, second rectifier means with input terminals connected parallel to the first input terminals and second output terminals for delivering a second pulsating direct voltage, and a flyback converter with input terminals connected to the second output terminals and output terminals connected parallel to the buffer capacitor, wherein the flyback converter is operative to deliver a maximum power which is substantially lower than the maximum power of the first rectifier means, and the flyback converter includes a transformer with a primary and a secondary winding, the primary winding being connected in series with a switching element which comprises a control electrode, the primary winding and the switching element forming a primary series circuit connected to the flyback converter input terminals, the secondary winding being connected in series with a rectifier element to form a secondary series circuit connected to the flyback converter output terminals, the control electrode of the switching element being connected to a control circuit which is operative to supply the control electrode with a first control signal in the form of a series of pulses.

2. A power supply as claimed in claim 1, further comprising a comparator circuit which is operative to compare a voltage difference between a voltage at an output terminal of the flyback converter with a voltage proportional to a peak value of the first pulsating direct voltage and to supply a control input of the control circuit with a second control signal which is dependent on said voltage difference and which influences the first control signal supplied by the control circuit in a manner such that a voltage between the output terminals of the flyback converter is substantially equal to the peak value of the first pulsating direct voltage.

3. A power supply as claimed in claim 2 wherein, between one of the flyback converter output terminals and one of the flyback converter input terminals, at least one self-inductance is connected, wherein an end of the self-inductance facing the primary series circuit is connected to an anode of a rectifier element whose cathode is connected to a positive electrode of the buffer capacitor.

4. A power supply as claimed in claim 1 wherein, at least one self-inductance is connected between one of the flyback converter output terminals and one of the flyback converter input terminals, and an end of said at least one self-inductance is coupled to an end of the primary series circuit and is coupled to an anode of a rectifier element whose cathode is connected to a positive electrode of the buffer capacitor.

5. A power supply as claimed in claim 4, wherein the self-inductance is a part of a high-frequency filter coupled between one of the flyback converter output terminals and one of the second output terminals.

6. An AC/DC power supply comprising:

a pair of input terminals for connection to a source of alternating voltage, a pair of output terminals, a capacitor coupled to said output terminals, first rectifier means having input terminals coupled to said pair of input terminals and output terminals coupled to said capacitor to supply a first pulsating direct voltage, second rectifier means having input terminals coupled to said pair of input terminals and output terminals supplying a second pulsating direct voltage, and a converter having input terminals coupled to the output terminals of the second rectifier means and output terminals coupled to said capacitor and operative to deliver a maximum power which is substantially lower than the maximum power of the first rectifier means, wherein said converter produces an output voltage at its output terminals that is substantially equal to the peak value of the first pulsating direct voltage.

7. The AC/DC power supply as claimed in claim 6 wherein said converter comprises a transformer with a primary winding coupled to a semiconductor switching device having a control electrode which receives a high frequency switching signal from a control circuit, wherein a secondary winding of the transformer is coupled to the output terminals of the converter.

8. The AC/DC power supply as claimed in claim 7 further comprising a comparator circuit having first and second input terminals coupled to an output terminal of the converter and to an output terminal of the second rectifier means, respectively, thereby to compare the voltage at said converter output terminal with a peak value of the second pulsating direct voltage so as to supply a control input of the control circuit with a control signal which causes the control circuit to supply a high frequency switching signal to the control electrode of the semiconductor switching device such that the converter produces at its output terminals said output voltage substantially equal to the peak value of the first pulsating direct voltage.

9. The AC/DC power supply as claimed in claim 8 wherein said second input terminal of the comparator circuit is coupled to the output of the second rectifier means via a peak detector including a diode coupled between the output of the second rectifier means and said second input terminal of the comparator circuit.

10. The AC/DC power supply as claimed in claim 7 wherein said control circuit comprises:

a control unit having first, second and third inputs and an output coupled to the control electrode of the semiconductor switching device, a zero current detection circuit having its input coupled to the transformer secondary winding and its output coupled to the first input of the control unit, means for supplying to the second input of the control circuit a control voltage dependent on the current flow through the semiconductor switching device, and a multiplier circuit having a first input which receives a voltage proportional to the second pulsating direct voltage, a second input which receives a voltage proportional to the output voltage of the converter, and an output coupled the third input of the control unit.

11. The AC/DC power supply as claimed in claim 7 further comprising a rectifier element connected between one terminal of the transformer secondary winding and one of the output terminals of the converter.

12. The AC/DC power supply as claimed in claim 7 further comprising:

inductance means coupled between the output of the second rectifier means and an input terminal of the converter, and at least one rectifier element coupled between the inductance means and one of said pair of output terminals so that, when the semiconductor switching device is switched off by said high frequency switching signal, magnetic energy is drained from the inductance means to said capacitor.

13. The AC/DC power supply as claimed in claim 12 wherein said inductance means comprises first and second series connected inductors with said one rectifier element connected to a junction point between the first and second inductors.

14. The AC/DC power supply as claimed in claim 6 further comprising an inverter having input terminals coupled to said pair of output terminals and output terminals for supplying an AC output voltage, and wherein said first and second pulsating direct voltages are substantially equal.

15. The AC/DC power supply as claimed in claim 6 further comprising:

inductance means coupled between the output of the second rectifier means and an input terminal of the converter, and at least one rectifier element coupled between the inductance means and one of said pair of output terminals so as to periodically drain magnetic energy from the inductance means to said capacitor.

16. The AC/DC power supply as claimed in claim 15 wherein said inductance means is part of a high frequency filter, and wherein said inductance means and said at least one rectifier element together operate as a part of a boost converter.

* * * * *